(12) United States Patent
Liu et al.

(10) Patent No.: US 11,411,480 B2
(45) Date of Patent: Aug. 9, 2022

(54) LINEAR VIBRATION ACTUATOR MOTOR

(71) Applicant: TOPRAY MEMS INC., Hsinchu (TW)

(72) Inventors: Chin-Sung Liu, Hsinchu (TW); Shin-Ter Tsai, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 465 days.

(21) Appl. No.: 16/594,243

(22) Filed: Oct. 7, 2019

(65) Prior Publication Data
US 2020/0350810 A1    Nov. 5, 2020

(30) Foreign Application Priority Data

Apr. 30, 2019 (TW) .................................. 108115064

(51) Int. Cl.
| | |
|---|---|
| *H02K 33/16* | (2006.01) |
| *H02K 33/02* | (2006.01) |
| *B06B 1/04* | (2006.01) |
| *H02K 33/12* | (2006.01) |
| *H02K 7/104* | (2006.01) |

(52) U.S. Cl.
CPC ............. *H02K 33/16* (2013.01); *H02K 7/104* (2013.01); *H02K 33/02* (2013.01); *H02K 33/12* (2013.01); *B06B 1/045* (2013.01)

(58) Field of Classification Search
CPC ........ H02K 33/18; H02K 33/12; H02K 33/16; H02K 1/34; H02K 33/02; H02K 7/104; B06B 1/045; B60L 7/28
See application file for complete search history.

(56) References Cited

U.S. PATENT DOCUMENTS

| | | | | |
|---|---|---|---|---|
| 2014/0354381 A1* | 12/2014 | Kohlhafer | .............. | H01H 50/20 335/179 |
| 2017/0222533 A1* | 8/2017 | Liu | ......................... | H02K 1/34 |
| 2018/0226869 A1* | 8/2018 | Zu | ......................... | H02K 33/18 |

FOREIGN PATENT DOCUMENTS

| | | | | | |
|---|---|---|---|---|---|
| CN | 207234640 U | * | 4/2018 | .............. | B06B 1/04 |
| CN | 108366324 A | * | 8/2018 | | |

(Continued)

OTHER PUBLICATIONS

Akanuma (CN 207234640 U) English Translation (Year: 2018).*

(Continued)

*Primary Examiner* — Tulsidas C Patel
*Assistant Examiner* — Robert E Mates
(74) *Attorney, Agent, or Firm* — Lin & Associates Intellectual Property, Inc.

(57) ABSTRACT

A linear vibration actuator motor comprises a housing, a coil, a conductive sheet, a bracket, a magnet assembly and two elastic members. The coil is fixed to the bottom wall of the housing. The conductive sheet is fixed to the top wall of the housing and is located above the coil. The bracket is disposed in an accommodating space of the housing, forming framed space, and located above the coil and below the conductive sheet. The magnet assembly is disposed in the framed space above the coil and directly below the conductive sheet. The two elastic members are respectively located between two ends of the bracket and the inner side of two side walls of the housing. Thereby, the invention utilizes the induced current to provide resistance to achieve the damping effect against the motion of the assembly of the bracket and the magnet set with respect to conductive sheet.

8 Claims, 6 Drawing Sheets

(56) References Cited

FOREIGN PATENT DOCUMENTS

JP          2008220020 A  *  9/2008
WO    WO-2018099042 A1  *  6/2018   ............. H02K 33/18

OTHER PUBLICATIONS

Mukaide (JP 2008220020 A) Engish Translation (Year: 2008).*
Qin (WO 2018099042 A1) English Translation (Year: 2018).*
Dong (CN 108366324 A) English Translation (Year: 2018).*

* cited by examiner

LINEAR VIBRATION ACTUATOR MOTOR

CROSS-REFERENCE TO RELATED APPLICATION

The present application is based on, and claims priority form, Taiwan Patent Application No. 108115064, filed Apr. 30, 2019, the disclosure of which is hereby incorporated by reference herein in its entirety.

TECHNICAL FIELD

The technical field generally relates to a linear vibration actuator (LRA) motors, particularly linear vibration actuator motors utilizing electromagnetic means to provide resistance to mitigate unwanted vibrations.

BACKGROUND

A mobile device or a wearable device is equipped with a vibration motor to provide vibration. When a user operates the mobile device or wears the device, the vibration motor in the mobile device or the wearable device can provide vibration to generate tactile feedback. Some mobile devices and wearable devices use linear vibration motors, which provide more diverse vibration performance.

A general linear vibration motor includes a housing, a coil, a bracket, a magnet set, and two elastic members. The coil is fixed to a bottom wall of the housing. The bracket is movably disposed inside the housing to form a framed space. The magnet set includes a plurality of magnets disposed in the framed space formed by the bracket above the coil. The two elastic members are respectively disposed between the two ends of the bracket and the two side walls of the housing, so that the two elastic members can support the assembly of the bracket and the magnet set, and guide the motion direction of the assembly of the bracket and the magnet set.

When the coil is continuously energized in positive and negative directions by electric current, the current through the coil can interact with the magnetic field generated by the magnet set to generate an electromagnetic force (i.e., Lorentz force). At this time, the electromagnetic force drives the magnet set together with the bracket to make a simple harmonic motion with respect to the conductive sheet in a first horizontal direction (i.e., the X-axis direction), thereby providing vibration to the mobile device or the wearable device, thereby generating the tactile feedback. The two elastic members provide a restoring force when the assembly of the bracket and the magnet set is displaced, so that the assembly of the bracket and the magnet set can be restored to the starting position.

However, when the mobile device or the wearable device is shaken by an external force, the bracket of the linear vibration motor may be shaken accordingly. Once the external force applied to the mobile device or the wearable device is excessively severe, the swaying of the bracket of the linear vibration motor becomes excessively large and often results in hitting the housing to make noise.

U.S. Pat. No. 7,358,633 utilizes attaching a magnetic fluid to the outer surface of a bracket. When the bracket hits the housing, the magnetic fluid attached to the outer surface of the bracket first contacts the housing to absorb the impact force and reduces the noise.

In addition, in some conventional linear vibration motors, magnetic fluid may also be applied between the coil and the magnet set carried by the bracket to provide resistance during the combined motion of the bracket and the magnet set, and reduce the impact of the bracket on the housing to reduce the noise.

However, the viscosity of the base fluid of the magnetic fluid is inversely proportional to the temperature. The higher the temperature, the smaller the viscosity of the magnetic fluid, and the lower the temperature, the greater the viscosity of the magnetic fluid. Especially at low temperatures, the viscosity of the base fluid of the magnetic fluid is too large; while at high temperatures, the viscosity of the base fluid of the magnetic fluid is too small. The magnetic fluid viscosity coefficient of some materials varies several times between 0 and 50° C. In general, due to viscosity often changing with temperature, the resistance provided by magnetic fluid to the assembly of the bracket and the magnet set during motion is unstable.

SUMMARY

The main object of the present invention is to provide a linear vibration actuator motor that utilizes an induced current generated when a conductive sheet moves relative to a magnetic field to provide a resistance to achieve the damping effect against the motion of the assembly of the bracket and the magnet set with respect to the conductive sheet to slow down unnecessary vibrations and avoid the bracket hitting the housing to reduce noise effectively.

Another object of the present invention is to provide a linear vibration actuator motor that provides resistance by electromagnetic means, has low temperature dependency, and has stable resistance.

To achieve the aforementioned objects, the present invention provides a linear vibration actuator motor, comprising a housing, a coil, a conductive sheet, a bracket, a magnet set, and two elastic members.

The housing comprises a top wall, a bottom wall and a plurality of side walls, and the top wall, the bottom wall, and the side walls of the housing together define an accommodating space, a vertical direction is defined from the bottom wall of the housing to the top wall of the housing, and a first horizontal direction is defined from one of the side walls of the housing toward the other side wall of the housing.

The coil is fixed to the bottom wall of the housing and has an axis, and the axis of the coil is parallel to the vertical direction.

The conductive sheet is fixed on the top wall of the housing and above the coil.

The bracket is movably disposed in the accommodating space of the housing, forming a framed space, and two opposite ends of the bracket in the first horizontal direction are respectively defined as a first end and a second end, the first horizontal direction is a motion direction of the bracket, wherein the bracket is located above the coil, with a gap between the bracket and the coil; the bracket is located below the conductive sheet, with a gap between the bracket and the conductive sheet.

The magnet set comprises a plurality of magnets disposed in the framed space of the bracket, above the coil, and directly below the conductive sheet.

One of the elastic members is located between an inner side of one of the side walls of the housing in the first horizontal direction and the first end of the bracket, and the other elastic member is located between an inner side of another side wall on the other side of the housing in the first horizontal direction and a second end of the bracket, each elastic member connects the housing and the bracket.

Preferably, the coil is fixed on an inner side of the bottom wall of the housing and is located in the accommodating space, and the conductive sheet is fixed on an inner side of the top wall of the housing and is located in the accommodating space.

Preferably, the coil is fixed on an inner side of the bottom wall of the housing and is located in the accommodating space; the top wall of the housing is disposed with a through hole, and the conductive sheet is embedded in the through hole.

Preferably, a first section and a second section of the coil perpendicular to the first horizontal direction are respectively located where the magnetic field generated by the magnet set is with a stronger vertical component.

Preferably, the linear vibration actuator motor further comprises a plurality of coils, and the coils are disposed on the bottom wall of the housing along the first horizontal direction.

Preferably, the conductive sheet is made of a metal or an alloy.

Preferably, the magnet set comprises three magnets, and the three magnets are respectively defined as a first magnet, a second magnet and a third magnet; the first magnet has an S pole and an N pole, the second magnet has an S pole and an N pole, the third magnet has an S pole and an N pole, and the first magnet, the second magnet and the third magnet are sequentially arranged at intervals along the first horizontal direction, and the N pole of the first magnet faces the first end of the bracket, the S pole of the first magnet faces the S pole of the second magnet, the N pole of the second magnet faces the N pole of the third magnet, and the S pole of the third magnet faces the second end of the bracket.

Preferably, the bracket comprises a top side and a bottom side, the magnet set comprises two magnets, and the two magnets are respectively defined as a first magnet and a second magnet; the first magnet has an S pole and an N pole, and the second magnet has an S pole and an N pole, and the first magnet and the second magnet are sequentially arranged at intervals along the first horizontal direction, and the S pole of the first magnet faces the top side of the bracket, the N pole of the first magnet faces the bottom side of the bracket, the S pole of the second magnet faces the bottom side of the bracket, and the S pole of the second magnet faces the top side of the bracket.

Preferably, the bracket comprises a top side and a bottom side, the magnet group comprises five magnets, and the five magnets are respectively defined as a first magnet, a second magnet, a third magnet, a fourth magnet and a fifth magnet; the first magnet has an S pole and an N pole, the second magnet has an S pole and an N pole, the third magnet has an S pole and an N pole, the fourth magnet has an S pole and an N pole, and the fifth magnet has a S pole and one N pole; the S pole of the third magnet faces the first end of the bracket, and the N pole of the third magnet faces the second end of the bracket; the first magnet and the second magnet are close to the S pole of the third magnet; the first magnet is located directly above the second magnet, the S pole of the first magnet faces the top side of the bracket, the S pole of the second magnet faces the bottom side of the bracket, and the N pole of the first magnet faces the N pole of the second magnet; the fourth magnet and the fifth magnet are close to the N pole of the third magnet; the fourth magnet is located directly above the fifth magnet, the N pole of the fourth magnet faces the top side of the bracket, and the N pole of the fifth magnet faces the bottom side of the bracket, and the S pole of the fourth magnet faces the S pole of the fifth magnet.

Preferably, the bracket comprises a top side and a bottom side, the magnet group comprises five magnets, and the five magnets are respectively defined as a first magnet, a second magnet, a third magnet, a fourth magnet and a fifth magnet; the first magnet has an S pole and an N pole, the second magnet has an S pole and an N pole, the third magnet has an S pole and an N pole, the fourth magnet has an S pole and an N pole, and the fifth magnet has a S pole and one N pole; the first magnet, the second magnet, the third magnet, the fourth magnet and the fifth magnet are sequentially arranged at intervals along the first horizontal direction; the S pole of the first magnet faces the bottom side of the bracket, the N pole of the first magnet faces the top side of the bracket, the N pole of the second magnet faces the first end of the bracket, the S pole of the second magnet faces the S pole of the third magnet, the N of the third magnet faces the N pole of the fourth magnet, the S pole of the fourth magnet faces the second end of the bracket, the S pole of the fifth magnet faces the top side of the bracket, and the N pole of the fifth pole faces the bottom side of the bracket.

The effect of the present invention is that when the mobile device or the wearable device mounted with the present invention is shaken by an external force, the present invention provides the right-bound or the left-bound resistance by utilizing the induced current generated when the conductive sheet moves relative to the magnetic field to resist the damping effect of the assembly of the bracket and the magnet set relative to the motion of the conductive sheet to alleviate unnecessary vibration, avoiding the outer surface of the bracket from hitting the housing, and effectively reducing noise.

Furthermore, although the conductive effect of the conductive sheet changes with temperature, the magnitude of the change is not as large as the magnetic fluid. Therefore, compared with the magnetic fluid, the present invention provides the resistance through the electromagnetic method, has a low temperature dependency, and is relatively stable.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
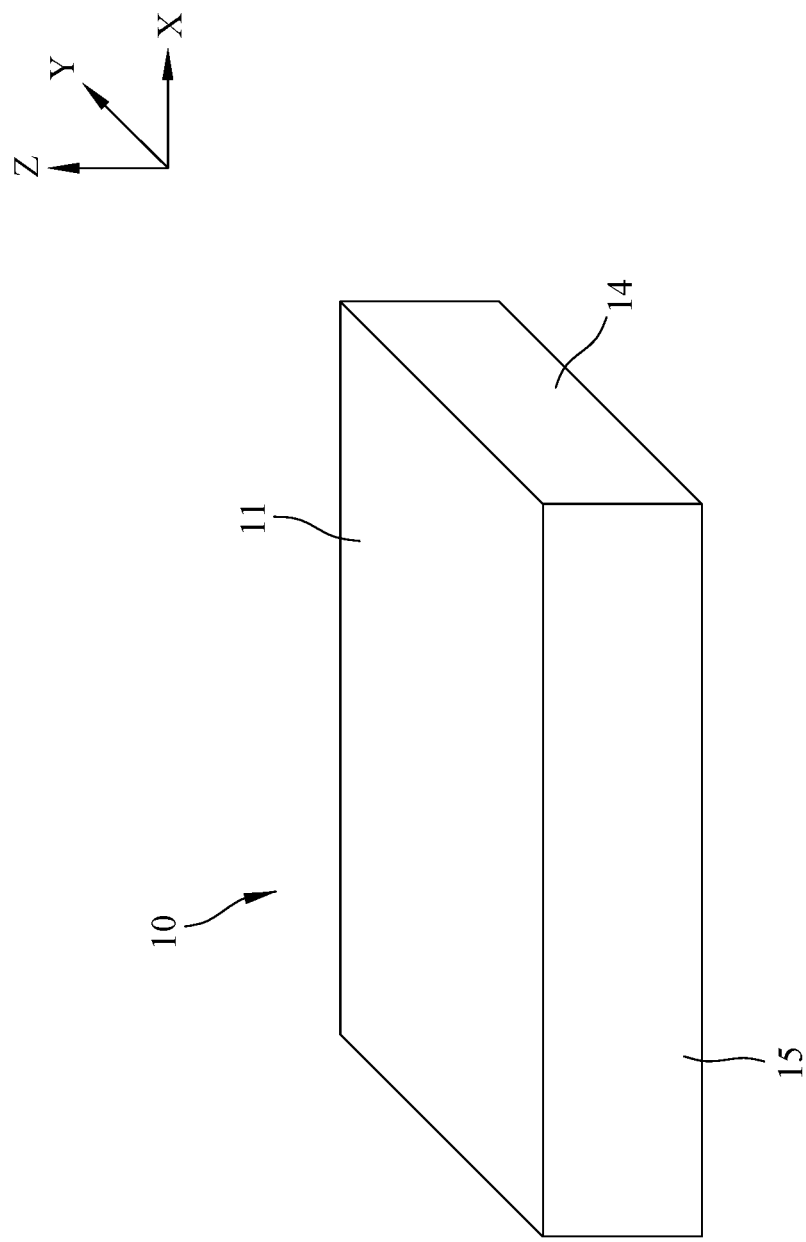
FIG. 1 shows a schematic view of the first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
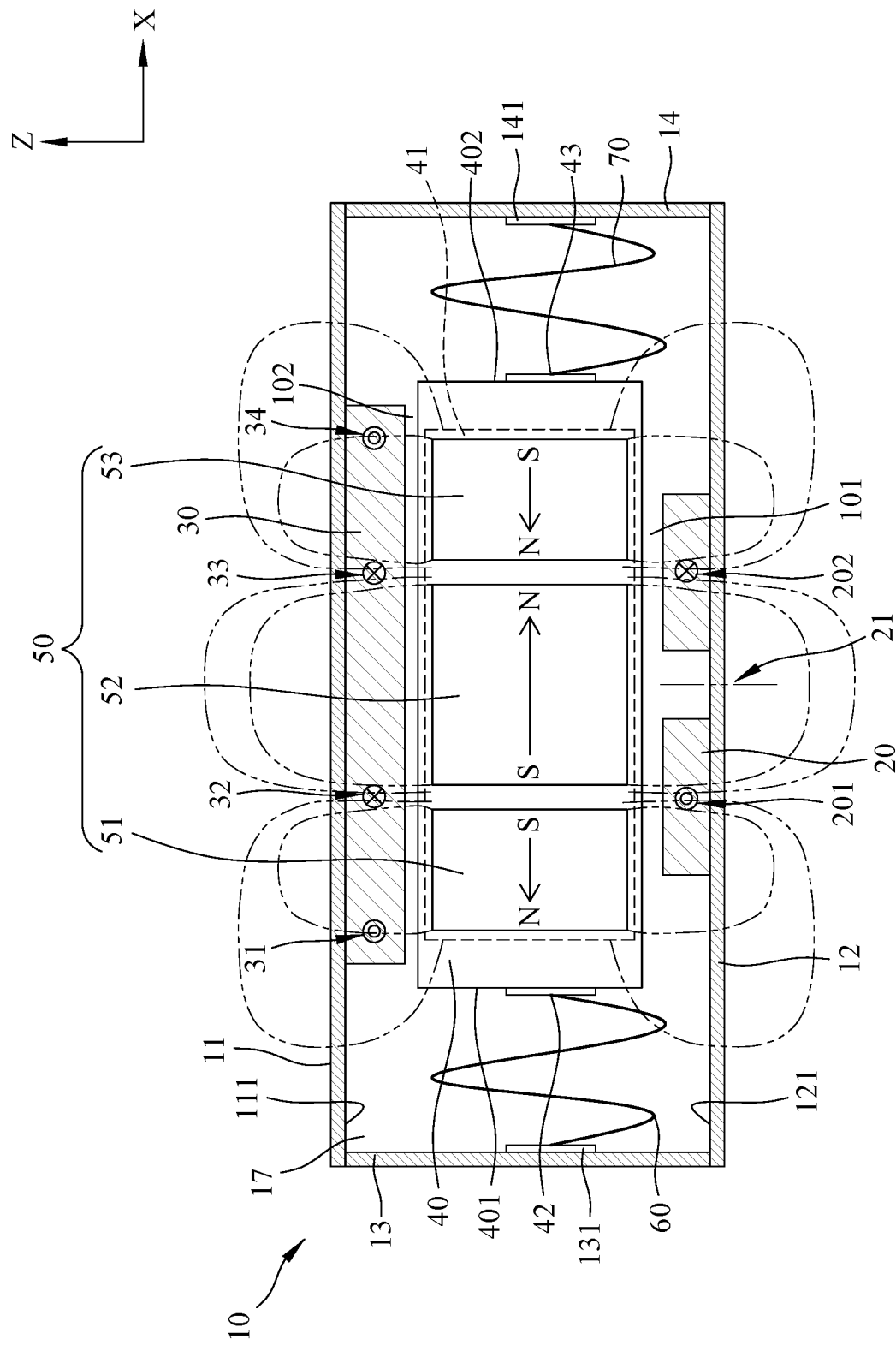
FIG. 2 shows a cross-sectional view of the first embodiment.

FIG. 1 and FIG. 2 are a schematic view and a cross-sectional view of a first embodiment of the present invention, respectively. The first embodiment of the present invention provides a linear vibration actuator motor comprising a housing 10, a coil 20, a conductive sheet 30, a bracket 40, a magnet assembly 50, and two elastic members 60, 70.

The housing 10 is a rectangular parallelepiped, and comprises a top wall 11, a bottom wall 12 and four side walls. The top wall 11 and the bottom wall 12 of the housing 10 together with the four side walls define an accommodating space 17. A vertical direction (i.e., the Z-axis direction) is defined from the bottom wall 12 of the housing 10 toward the top wall 11 of the housing 10. The two side walls located in the longitudinal direction of the housing 10 (i.e., the X-axis direction) are respectively defined as a first side wall 13 and a second side wall 14, and the two side walls in the width direction of the housing 10 (i.e., the Y-axis direction) are defined respectively as a third side wall 15 and a fourth side wall (not shown). A first horizontal direction (i.e., an X-axis direction) is defined from the first side wall 13 of the housing 10 toward the second side wall 14 of the housing 10. A second horizontal direction (i.e., the Y-axis direction) is defined from the third side wall 15 of the housing 10 to the fourth side of the housing 10. Preferably, the top wall 11 of the housing 10 has a solid structure without any holes and thus exhibits a completely closed state.

The coil 20 is fixed to an inner side 121 of the bottom wall 12 of the housing 10 and located in the accommodating space 17, and has an axis 21. The axis 21 of the coil 20 is parallel to the vertical direction (i.e., the Z-axis direction).

The conductive sheet 30 is fixed to an inner side 111 of the top wall 11 of the housing 10, located in the accommodating space 17 and above the coil 20. The material of the conductive sheet 30 is a metal or an alloy; preferably, the conductive sheet 30 is made of copper, copper alloy, aluminum or aluminum alloy.

The bracket 40 is movably disposed in the accommodating space 17 of the housing 10, forming a framed space 41, and defining a first end 401 and a second end 402 at opposite ends in the first horizontal direction (i.e., the X-axis direction). The first horizontal direction (i.e., the X-axis direction) is a motion direction of the bracket 40. The bracket 40 is located above the coil 20, with a gap 101 between the bracket 40 and the coil 20; the bracket 40 is located below the conductive sheet 30, with a gap 102 between the bracket 40 and the conductive sheet 30.

The magnet set 50 comprises three magnets, and the three magnets are respectively defined as a first magnet 51, a second magnet 52 and a third magnet 53; the first magnet 51 has an S pole and an N pole, and the second magnet 52 has an S pole and an N pole, and the third magnet 53 has an S pole and an N pole. The first magnet 51, the second magnet 52 and the third magnet 53 are sequentially arranged at intervals along the first horizontal direction (i.e., X-axis direction) in the framed space 41 of the bracket 40, located above the coil 20 and directly below the conductive sheet 30. The N pole of the first magnet 51 faces the first end 401 of the bracket 40, the S pole of the first magnet 51 faces the S pole of the second magnet 52, the N pole of the second magnet 52 faces the N pole of the third magnet 53, and the S pole of the third magnet 53 faces the second end 402 of the bracket 40.

Each magnet has a magnetization direction, which means that the magnetic field lines run from the S pole of the magnet, through the inside of the magnet and return to the N pole of the magnet.

Specifically, the magnetic field lines of the first magnet 51 extend upward or downward from the N pole. The upward extending magnetic field lines extend upward or through a first region 31 of the conductive sheet 30, then extend downward through a second region 32 of the conductive sheet 30, and finally return to the S pole of the first magnet 51. The downward extending magnetic field lines pass through the coil 20 and extend upward through a first section 201 of the coil 20 and then back to the S pole of the first magnet 51. The magnetic field lines returning to the S pole of the first magnet 51 extend through the inside of the first magnet 51 toward the N pole of the first magnet 51, which is the magnetization direction of the first magnet 51.

The magnetic field lines of the second magnet 52 extend upward or downward from the N pole. The upward extending magnetic field lines extend upward through a third region 33 of the conductive sheet 30, extend downward through the second region 32 of the conductive sheet 30, and then return to the S pole of the second magnet 52. The downward extending magnetic field lines pass through a second section 202 of the coil 20, extend upward through the first section 201 of the coil 20, and then return to the S pole of the second magnet 52. The magnetic field lines returning to the S pole of the second magnet 52 extend through the inside of the second magnet 52 toward the N pole of the second magnet 52, which is the magnetization direction of the second magnet 52.

The magnetic field lines of the third magnet 53 extend upward or downward from the N pole. The upward extending magnetic field lines first pass upward through the third region 33 of the conductive sheet 30, and then extend downward or through a fourth region 34 of the conductive sheet 30, and then return to the S pole of the third magnet 53. The magnetic field lines extending downward pass through the second section 202 of the coil 20 and then return to the S pole of the third magnet 53. The magnetic field lines returning to the S pole of the third magnet 53 extend through the inside of the third magnet 53 toward the N pole of the third magnet 53, which is the magnetization direction of the third magnet 53.

The magnetization directions of the first magnet 51, the second magnet 52, and the third magnet 53 are all parallel to the first horizontal direction (i.e., the X-axis direction). However, the magnetization directions of the first magnet 51 and the third magnet 53 are both toward the first end 401 of the bracket 40, and the magnetization direction of the second magnet 52 is toward the second end 402 of the bracket 40, so that obviously the magnetization direction of the second magnet 52 is opposite to the magnetization directions of the first magnet 51 and the third magnet 53.

One of the elastic members 60 is located between the inner side of the first side wall 13 of the housing 10 in the first horizontal direction (i.e., the X-axis direction) and the first end 401 of the bracket 40, and the other elastic member 70 is located between an inner side of the second side wall 14 of the housing 10 in the first horizontal direction (i.e., the X-axis direction) and the second end 402 of the bracket 40. The two elastic members 60, 70 connect the housing 10 and the bracket 40. In the first embodiment, the two elastic members 60, 70 respectively have a first end and a second end. The first end of the elastic members 60 is connected to a connecting portion 42 of an outer side of the first end 401 of the bracket 40, while the second end of the elastic member 60 is connected to a connecting portion 131 of the inner side of the first side wall 13 in the housing 10 in the first horizontal direction (i.e., the X-axis direction). The first end of the other elastic member 70 is connected to a connecting portion 43 of an outer side of the second end 402 of the bracket 40, and the second end of the other elastic member 70 is connected to a connecting portion 141 of the inner side of the second side wall 14 in the housing 10 in the first horizontal direction (i.e., the X-axis direction). Thereby, the two elastic members 60, 70 can support the assembly of the bracket 40 and the magnet set 50 to guide the motion direction of the assembly of the bracket 40 and the magnet set 50.

A mobile device (not shown) or a wearable device (not shown) can be configured to comprise the linear vibration actuator motor of the present invention to provide vibration. The mobile device is also referred to as a handheld device, a mobile terminal, a mobile communication terminal, etc., such as a mobile phone, a notebook computer, a tablet computer, a car computer, and so on. The wearable device is a miniature electronic device that can be worn on the body for outdoor activity, such as a head-mounted display, a smart bracelet, a smart watch, and so on.

Furthermore, when the user operates the mobile device or the wearable device, a connection circuit (not shown) continuously supplies the forward and reverse current to the coil 20, and the coil 20 is continuously energized in the forward and reverse directions. The current through the coil 20 can interact with the magnetic field generated by the magnet set 50 to generate an electromagnetic force (i.e., Lorentz force). At this point, the magnet set 50 is driven by the electromagnetic force to drive the bracket 40 together to perform a simple harmonic motion with respect to the conductive sheet 30 in the first horizontal direction (i.e., the X-axis direction), thereby providing vibration to the mobile device or the wearable device to generate tactile feedback. Therefore, the first horizontal direction (i.e., the X-axis direction) is indeed the motion direction of the bracket 40. Once the connection circuit stops supplying the current to the coil 20, the electromagnetic force will disappear immediately. At this point, the two elastic members 60, 70 provide the restoring force when the assembly of the bracket 40 and the magnet set 50 is displaced, so that the assembly of the bracket 40 and the magnet set 50 can return to the starting position.

When the magnet set 50 is driven by the electromagnetic force to move the assembly of the bracket 40 and the magnet set 50 toward the left in the first horizontal direction (i.e., the X-axis direction) with respect to the conductive sheet 30, the assembly of the bracket 40 and the magnet set 50 moves toward left with respect to the conductive sheet 30 at a speed, which corresponds to the conductive sheet 30 moves toward right with respect to the assembly of the bracket 40 and the magnet set 50 in a magnetic field at a corresponding speed, so that the conductive sheet 30 generates an induced current (Eddy Current). When the conductive sheet 30 moves in the magnetic field generated by the magnet set 50, the induced current of the conductive sheet 30 and the magnetic field of the magnet set 50 act to provide a rightward resistance when the assembly of the bracket 40 and the magnet set 50 move toward the left.

When the magnet set 50 is driven by the electromagnetic force to move the assembly of the bracket 40 and the magnet set 50 toward the right in the first horizontal direction (i.e., the X-axis direction) with respect to the conductive sheet 30, the assembly of the bracket 40 and the magnet set 50 moves toward right with respect to the conductive sheet 30 at a speed, which corresponds to the conductive sheet 30 moves toward left with respect to the assembly of the bracket 40 and the magnet set 50 in a magnetic field at a corresponding speed, so that the conductive sheet 30 generates an induced current (Eddy Current). When the conductive sheet 30 moves in the magnetic field generated by the magnet set 50, the induced current of the conductive sheet 30 and the magnetic field of the magnet set 50 act to provide a leftward resistance when the assembly of the bracket 40 and the magnet set 50 move toward the right.

When the mobile device or the wearable device of the present invention is shaken by an external force, the present invention utilizes the induced current generated by the conductive sheet 30 relative to the magnetic field to provide a rightward resistance or a leftward resistance against a damping effect exhibited by the motion of the assembly of the bracket 40 and the magnet set 50 with respect to the conductive sheet 30 to alleviate unnecessary vibrations, preventing the outer surface of the bracket 40 from hitting the housing 10 and effectively reducing noise.

Furthermore, although the conductive effect of the conductive sheet 30 changes with temperature, the magnitude of the change is not as large as the magnetic fluid. Therefore, compared with the magnetic fluid, the present invention provides the resistance by the electromagnetic method, has a low temperature dependency, and is relatively stable.

In addition, the magnet set 50 simultaneously serves as a source of magnetic field to provide resistance and for driving bracket 40 to move, which effectively simplifies the number of components and assembly steps.

Furthermore, the magnet set 50 is located directly below the conductive sheet 30. In other words, the magnet set 50 is covered in the spatial range of the vertical direction (i.e., the Z-axis direction) of the conductive sheet 30, so that the vertical component (i.e., the Z-axis direction) of the magnetic field established by the magnet set 50 is almost covered by the conductive sheet 30. Accordingly, the resistance generated by the induced current generated by the interaction of the conductive sheet 30 and the magnetic field of the magnet set 50 almost covers the range of movement of the magnet set 50. In other words, the magnet set 50 is under influence by the resistance no matter where the magnet set 50 moves to.

It is worth mentioning that because the magnetic field lines of the first magnet 51 and the magnetic field lines of the second magnet 52 extend upward through the first section 201 of the coil 20 and the magnetic field lines of the second magnet 52 and the magnetic field lines of the third magnet 53 extend downward through the second section 202 of the coil 20, therefore, the first section 201 of the coil 20 is located exactly where the magnetic field lines of the first magnet 51 and the second magnet 52 are densest, and the second section 202 of the coil 20 is located where the magnetic field lines of the second magnet 52 and the third magnet 53 are the densest. Since the strongest vertical component (i.e., the Z-axis direction) of the magnetic field generated by the adjacent two magnets is where the magnetic field lines are the densest, the first section 201 and the second section 202 of the coil 20, which is perpendicular to the first horizontal direction (i.e., the X-axis direction), are respectively located where the vertical component (i.e., the Z-axis direction) of the magnetic field generated by the magnet set 50 are stronger. The advantage of this technical feature is that the generated electromagnetic force is larger.

Figure 3:
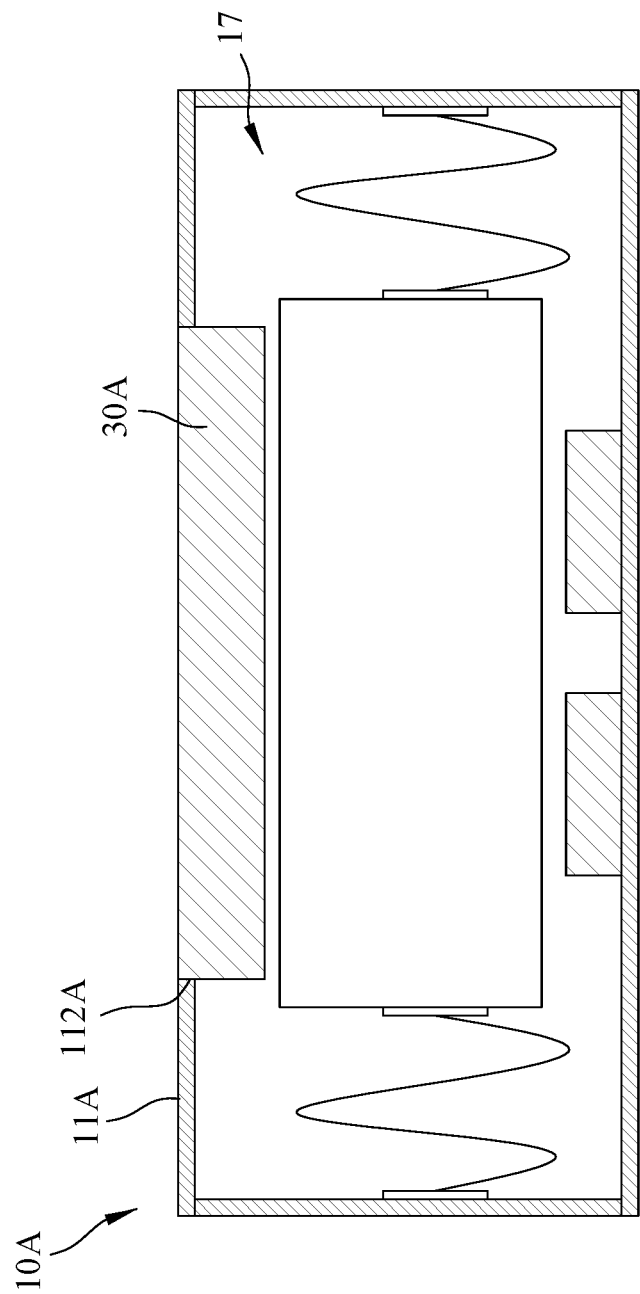
FIG. 3 shows a cross-sectional view of the second embodiment.

Refer to FIG. 3. FIG. 3 is a cross-sectional view showing a second embodiment of the present invention. The structural difference between the second embodiment and the first embodiment is that the structure of the housing 10A and the position of the conductive sheet 30A are different. More specifically, the top wall 11A of the housing 10A is disposed with a through hole 112A, and the conductive sheet 30A is embedded in the through hole 112A. The top surface of the conductive sheet 30A is flush with the top surface of the top wall 11A of the housing 10A, and the conductive sheet 30A protrudes toward the accommodating space 17 of the housing 10A. Except for this, the remaining structure of the second embodiment is the same as that of the first embodiment. The effect achieved by the second embodiment is exactly the same as that of the first embodiment.

Figure 4:
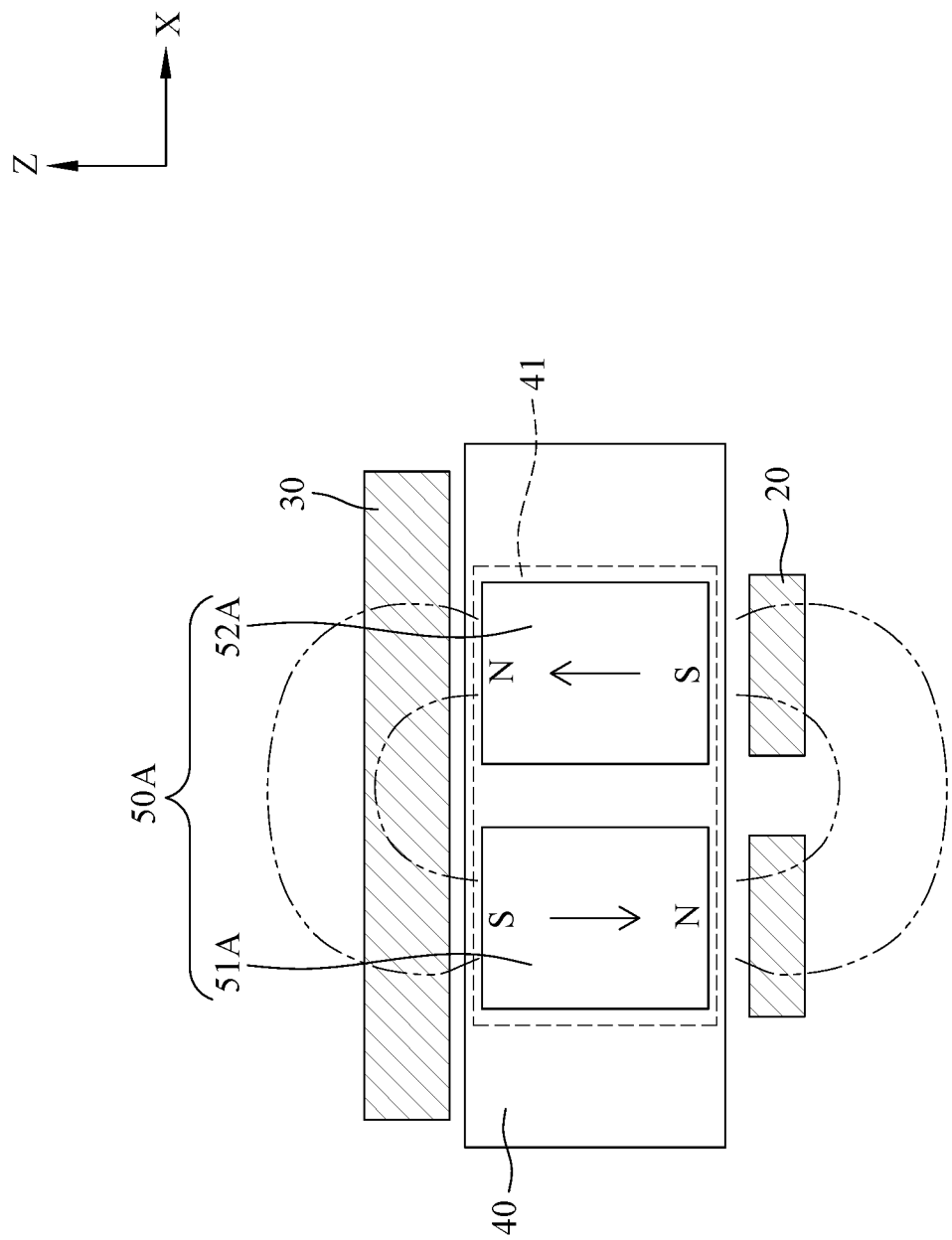
FIG. 4 shows a cross-sectional view of the third embodiment.

Refer to FIG. 4. FIG. 4 is a cross-sectional view showing a third embodiment of the present invention. The third embodiment differs from the first embodiment and the second embodiment in that the number of magnets is different and the arrangement of the magnets is different. More specifically, the bracket 40 comprises a top side and a bottom side, and the magnet set 50A comprises two magnets, which are respectively defined as a first magnet 51A and a second magnet 52A. The first magnet 51A has an S pole and an N pole, and the second magnet 52A has an S pole and an N pole. The first magnet 51A and the second magnet 52A are sequentially disposed at interval in the framed space 41 of the bracket 40 in the first horizontal direction (i.e., the X-axis direction), above the coil 20, and directly below the conductive sheet 30. The S pole of the first magnet 51A faces the top side of the bracket 40, and the N pole of the first magnet 51A faces the bottom side of the bracket 40. The S pole of the second magnet 52A faces the bottom side of the bracket 40, and the N pole of the second magnet 52A faces the top side of the bracket 40. The magnetic field lines of the first magnet 51A extend outward and downward from the N pole through the first section of the coil 20, then extend upward through the second section of the coil 20, and then into the S pole of the second magnet 52A. The magnetic field lines entering the S pole of the second magnet 52A extend through the inside of the second magnet 52A toward the N pole of the second magnet 52A, which is the magnetization direction of the second magnet 52A. The magnetic field lines of the second magnet 52A extend outward and upward from the N pole through the first region of the conductive sheet 30, then extend downward through the second region of the conductive sheet 30, and then enter the S pole of the first magnet 51A. The magnetic field lines entering the S pole of the first magnet 51A extend through the inside of the first magnet 51A toward the N pole of the first magnet 51A, which is the magnetization direction of the first magnet 51A. The magnetization directions of the first magnet 51A and the second magnet 52A are both parallel to the vertical direction (i.e., the Z-axis direction), but the magnetization direction of the first magnet 51A is opposite to the magnetization direction of the second magnet 52A. The third embodiment can achieve the effects of the first embodiment and the second embodiment. It is worth mentioning that, compared with the first embodiment and the second embodiment, the framed space 41 of the bracket 40 of the third embodiment has a small space and less magnets, so that the overall volume is smaller and the weight is less.

Figure 5:
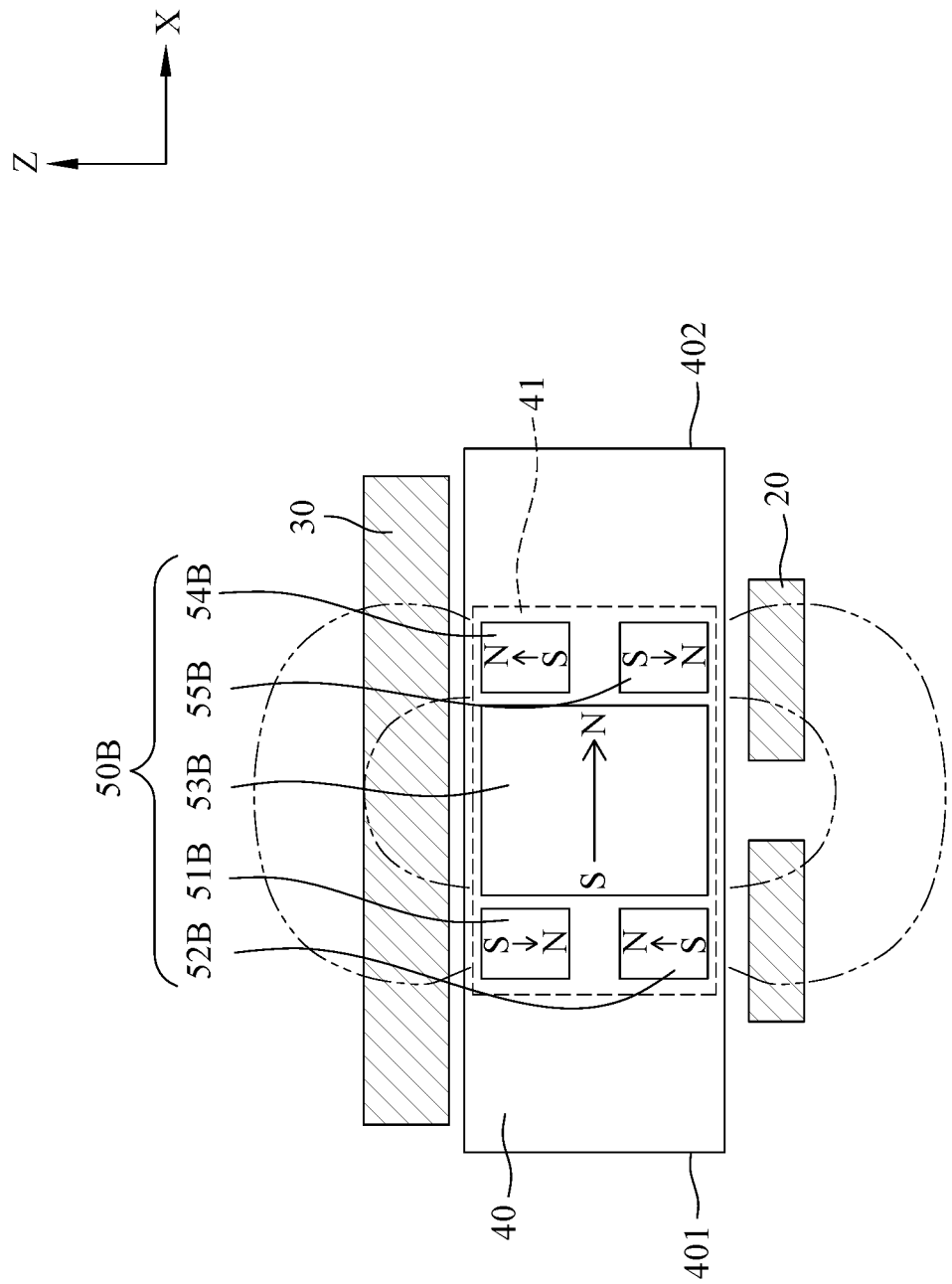
FIG. 5 shows a cross-sectional view of the fourth embodiment.

Refer to FIG. 5. FIG. 5 is a cross-sectional view showing a fourth embodiment of the present invention. The fourth embodiment differs from the first to third embodiments in that the number of magnets is different and the arrangement of the magnets is different. More specifically, the bracket 40 comprises a top side and a bottom side, and the magnet set 50B comprises five magnets, which are respectively defined as a first magnet 51B, a second magnet 52B, a third magnet 53B, a fourth magnet 54B and a fifth magnet 55B. The first magnet 51B has an S pole and an N pole, the second magnet 52B has an S pole and an N pole, the third magnet 53B has an S pole and an N pole, the fourth magnet 54B has an S pole and an N pole, and the fifth magnet 55B has an S pole and an N pole. The first magnet 51B, the second magnet 52B, the third magnet 53B, the fourth magnet 54B, and the fifth magnet 55B are disposed in the framed space 41 of the bracket 40, above the coil 20, and directly under the conductive sheet 30. The S pole of the third magnet 53B faces the first end 401 of the bracket 40, and the N pole of the third magnet 53B faces the second end 402 of the bracket 40. The first magnet 51B and the second magnet 52B are close to the S pole of the third magnet 53B, and the first magnet 51B is located directly above the second magnet 52B. The S pole of the first magnet 51B faces the top side of the bracket 40, the S pole of the second magnet 52B faces the bottom side of the bracket 40, and the N pole of the first magnet 51B faces the N pole of the second magnet 52B. The fourth magnet 54B and the fifth magnet 55B are close to the N pole of the third magnet 53B, and the fourth magnet 54B is located directly above the fifth magnet 55B. The N pole of the fourth magnet 54B faces the top side of the bracket 40, the N pole of the fifth magnet 55B faces the bottom side of the bracket 40, and the S pole of the fourth magnet 54B faces the S pole of the fifth magnet 55B. The magnetic field lines of the first magnet 51B and the magnetic field lines of the second magnet 52B both extend outward from the N pole and enter the S pole of the third magnet 53B. The magnetic field lines entering the S pole of the third magnet 53B extend through the inside of the third magnet 53B toward the N pole of the third magnet 53B, which is the magnetization direction of the third magnet 53B. The magnetic field lines of the third magnet 53B extend outward from the N pole of the third magnet 53B and enter the S pole of the fourth magnet 54B and the S pole of the fifth magnet 55B. The magnetic flux entering the S pole of the fourth magnet 54B extends through the inside of the fourth magnet 54B toward the N pole of the fourth magnet 54B, which is the magnetization direction of the fourth magnet 54B. The magnetic field lines entering the S pole of the fifth magnet 55B extend through the inside of the fifth magnet 55B toward the N pole of the fifth magnet 55B, which is the magnetization direction of the fifth magnet 55B. The magnetic field lines of the fourth magnet 54B extends outward from the N pole of the fourth magnet 54B through the first region of the conductive sheet 30, and then extends downward through the second region of the conductive sheet 30, and then enters the S pole of the first magnet 51B. The magnetic field lines of the fifth magnet 55B extend outward from the N pole of the fifth magnet 55B through the second section of the coil 20, and then extend upward through the first section of the coil 20 and then into the S pole of the second magnet 52B. The magnetic field lines entering the S pole of the first magnet 51B extend through the inside of the first magnet 51B toward the N pole of the first magnet 51B, which is the magnetization direction of the first magnet 51B. The magnetic field lines entering the S pole of the second magnet 52B extend through the inside of the second magnet 52B toward the N pole of the second magnet 52B, which is the magnetization direction of the second magnet 52B. The magnetization directions of the first magnet 51B, the second magnet 52B, the fourth magnet 54B, and the fifth magnet 55B are parallel to the vertical direction (i.e., the Z-axis direction), and the magnetization direction of the third magnet 53B is parallel to the first horizontal direction (i.e., X-axis direction). The magnetization direction of the first magnet 51B is opposite to the magnetization direction of the second magnet 52B, and the magnetization direction of the fourth magnet 54B is opposite to the magnetization direction of the fifth magnet 55B. The fourth embodiment can achieve the effects of the first to third embodiments. It should be noted that, compared with the third embodiment, the framed space 41 of the bracket 40 of the fourth embodiment has a smaller space. Although the magnet set 50 has more magnets, the volume of the first magnet 51B, the second magnet 52B, the fourth magnet 54B and the fifth magnet 55B of the fourth embodiment is smaller than that of the first magnet 51A and the second magnet 52A of the third embodiment, the overall volume of the fourth embodiment is smaller and the weight less.

Figure 6:
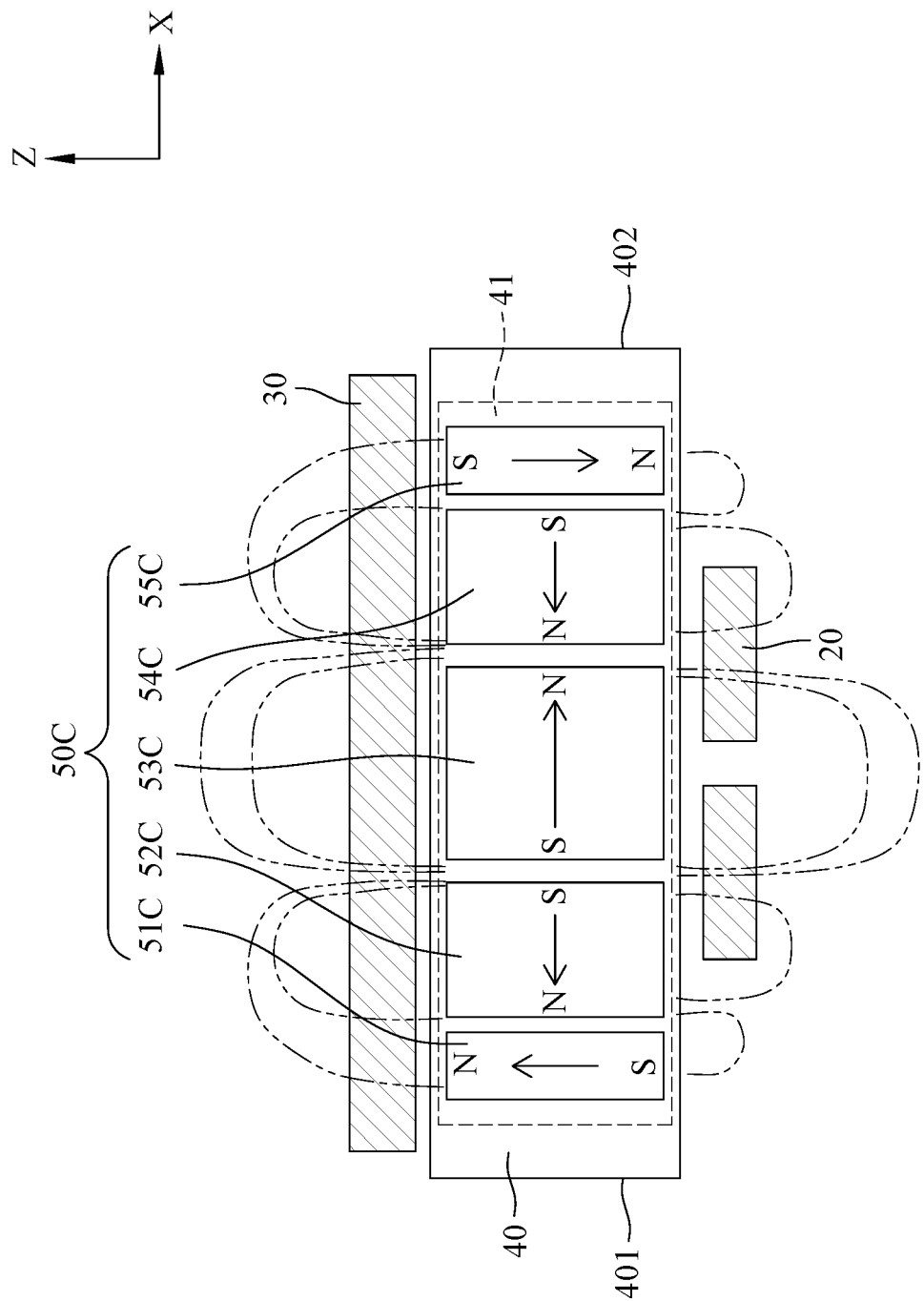
FIG. 6 shows a cross-sectional view of the fifth embodiment.

Refer to FIG. 6. FIG. 6 is a cross-sectional view showing a fifth embodiment of the present invention. The difference between the fifth embodiment and the fourth embodiment is that the magnets are arranged in a different manner. More specifically, the bracket 40 comprises a top side and a bottom side, and the magnet set 50C comprises five magnets, which are respectively defined as a first magnet 51C, a second magnet 52C, a third magnet 53C, a fourth magnet 54C and a fifth magnet 55C. The first magnet 51C has an S pole and an N pole, the second magnet 52C has an S pole and an N pole, the third magnet 53C has an S pole and an N pole, and the fourth magnet 54C has an S pole and an N pole. The fifth magnet 55C has an S pole and an N pole. The first magnet 51C, the second magnet 52C, the third magnet 53C, the fourth magnet 54C, and the fifth magnet 55C are sequentially disposed at intervals in the framed space 41 of the bracket 40 along the first horizontal direction (i.e., the X-axis direction), located above the coil 20 and directly below the conductive sheet 30. The S pole of the first magnet 51C faces the bottom side of the bracket 40, and the N pole of the first magnet 51C faces the top side of the bracket 40. The N pole of the second magnet 52C faces the first end 401 of the bracket 40, and the S pole of the second magnet 52C faces the S pole of the third magnet 53C. The N pole of the third magnet 53C faces the N pole of the fourth magnet 54C. The S pole of the fourth magnet 54C faces the second end 402 of the bracket 40. The S pole of the fifth magnet 55C faces the top side of the bracket 40, and the N pole of the fifth pole faces the bottom side of the bracket 40. The magnetic field lines extending direction and magnetization direction of the second magnet 52C of the fifth embodiment are the same as those of the first magnet 51 of the first embodiment. The magnetic field lines extending direction and magnetization direction of the third magnet 53C of the fifth embodiment are the same as those of the second magnet 52 of the first embodiment. The magnetic field lines extending direction and magnetization direction of the fourth magnet 54C of the fifth embodiment are the same as those of the third magnet 53 of the first embodiment. The magnetic field lines of the first magnet 51C of the fifth embodiment extend from the N pole outward and upward through the fifth region of the conductive sheet 30, then extend downward through the second region of the conductive sheet 30, and then enter the S pole of the second magnet 52C. A portion of the magnetic field lines of the second magnet 52C of the fifth embodiment extends outward from the N pole into the S pole of the first magnet 51C. The magnetic field lines entering the S pole of the first magnet 51C extend through the inside of the first magnet 51C toward the N pole of the first magnet 51C, which is the magnetization direction of the first magnet 51C. A portion of the magnetic field lines of the fourth magnet 54C of the fifth embodiment extends from the N pole outward and upward through the third region of the conductive sheet 30, then extend downward through the sixth region of the conductive sheet 30, and then enter the S pole of the fifth magnet 55C. The magnetic field lines entering the S pole of the fifth magnet 55C extend through the inside of the fifth magnet 55C toward the N pole of the fifth magnet 55C, which is the magnetization direction of the fifth magnet 55C. The magnetic field lines of the fifth magnet 55C extend outward from the N pole into the S pole of the fourth magnet 54C. The magnetization directions of the first magnet 51C and the fifth magnet 55C are both parallel to the vertical direction (i.e., the Z-axis direction), but the magnetization direction of the first magnet 51C is opposite to the magnetization direction of the fifth magnet 55C. The useless magnetic field of the coil 20 of the fifth embodiment is offset. Furthermore, the fifth embodiment has more magnets and the conductive sheets 30 are longer, so that the resistance is increased. However, the framed space 41 of the bracket 40 of the fifth embodiment is relatively large, the overall volume is increased, and the weight is also increased.

In other embodiments, the number of magnets of the magnet set may be increased by more than five and sequentially disposed along the first horizontal direction (i.e., the X-axis direction) while extending the length of the conductive sheet. To cope with this technical feature, this embodiment requires more coils which are disposed from each other in the first horizontal direction (i.e., the X-axis direction) on the inner side of the bottom wall of the housing.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A linear vibration actuator motor, comprising:
    a housing comprising a top wall, a bottom wall and a plurality of side walls, and the top wall, the bottom wall, and the side walls of the housing together defining an accommodating space, a vertical direction being defined from the bottom wall of the housing to the top wall of the housing, and a first horizontal direction being defined from one of the side walls of the housing toward an other side wall of the housing;
    a coil fixed to the bottom wall of the housing and having an axis, and the axis of the coil being parallel to the vertical direction;
    a conductive sheet fixed on the top wall of the housing and above the coil;
    a bracket movably disposed in the accommodating space of the housing, forming a framed space, and two opposite ends of the bracket in the first horizontal direction being respectively defined as a first end and a second end, the first horizontal direction being a motion direction of the bracket, wherein the bracket being located above the coil, with a gap between the bracket and the coil; the bracket being located below the conductive sheet with a gap between the bracket and the conductive sheet;
    a magnet set comprising a plurality of magnets disposed in the framed space of the bracket, above the coil, and directly below the conductive sheet; and
    two elastic members with one of the elastic members located between an inner side of one of the side walls of the housing in the first horizontal direction and the first end of the bracket, and the other elastic member located between an inner side of another side wall on the other side of the housing in the first horizontal direction and the second end of the bracket, each elastic member connecting the housing and the bracket;

wherein the coil is fixed on an inner side of the bottom wall of the housing and is located in the accommodating space, the top wall of the housing is disposed with a through hole, and the conductive sheet is embedded in the through hole.

2. The linear vibration actuator motor as claimed in claim 1, wherein a first section and a second section of the coil perpendicular to the first horizontal direction are respectively located where a magnetic field generated by the magnet set is with a stronger vertical component.

3. The linear vibration actuator motor as claimed in claim 1, wherein the linear vibration actuator motor further comprises a plurality of coils, and the coils are disposed on the bottom wall of the housing along the first horizontal direction.

4. The linear vibration actuator motor as claimed in claim 1, wherein the conductive sheet is made of one of any combination of metal and alloy.

5. The linear vibration actuator motor as claimed in claim 1, wherein the magnet set comprises three magnets, and the three magnets are respectively defined as a first magnet, a second magnet and a third magnet; the first magnet has an S pole and an N pole, and the second magnet has an S pole and an N pole, the third magnet has an S pole and an N pole, and the first magnet, the second magnet and the third magnet are sequentially arranged at intervals along the first horizontal direction; the N pole of the first magnet faces the first end of the bracket, the S pole of the first magnet faces the S pole of the second magnet, the N pole of the second magnet faces the N pole of the third magnet, and the S pole of the third magnet faces the second end of the bracket.

6. The linear vibration actuator motor as claimed in claim 1, wherein the bracket comprises a top side and a bottom side, the magnet set comprises two magnets, and the two magnets are respectively defined as a first magnet and a second magnet; the first magnet has an S pole and an N pole, and the second magnet has an S pole and an N pole, and the first magnet and the second magnet are sequentially arranged at intervals along the first horizontal direction; the S pole of the first magnet faces the top side of the bracket, the N pole of the first magnet faces the bottom side of the bracket, the S pole of the second magnet faces the bottom side of the bracket, and the S pole of the second magnet faces the top side of the bracket.

7. The linear vibration actuator motor as claimed in claim 1, wherein the bracket comprises a top side and a bottom side, the magnet set comprises five magnets, and the five magnets are respectively defined as a first magnet, a second magnet, a third magnet, a fourth magnet and a fifth magnet; the first magnet has an S pole and an N pole, the second magnet has an S pole and an N pole, the third magnet has an S pole and an N pole, the fourth magnet has an S pole and an N pole, and the fifth magnet has an S pole and one N pole; the first magnet, the second magnet, the third magnet, the fourth magnet and the fifth magnet are sequentially arranged at intervals along the first horizontal direction; the S pole of the first magnet faces the bottom side of the bracket, the N pole of the first magnet faces the top side of the bracket, the N pole of the second magnet faces the first end of the bracket, the S pole of the second magnet faces the S pole of the third magnet, the N of the third magnet faces the N pole of the fourth magnet, the S pole of the fourth magnet faces the second end of the bracket, the S pole of the fifth magnet faces the top side of the bracket, and the N pole of the fifth pole faces the bottom side of the bracket.

8. A linear vibration actuator motor, comprising:

a housing comprising a top wall, a bottom wall and a plurality of side walls, and the top wall, the bottom wall, and the side walls of the housing together defining an accommodating space, a vertical direction being defined from the bottom wall of the housing to the top wall of the housing, and a first horizontal direction being defined from one of the side walls of the housing toward an other side wall of the housing;

a coil fixed to the bottom wall of the housing and having an axis, and the axis of the coil being parallel to the vertical direction;

a conductive sheet fixed on the top wall of the housing and above the coil;

a bracket movably disposed in the accommodating space of the housing, forming a framed space, and two opposite ends of the bracket in the first horizontal direction being respectively defined as a first end and a second end, the first horizontal direction being a motion direction of the bracket, wherein the bracket being located above the coil, with a gap between the bracket and the coil; the bracket being located below the conductive sheet, with a gap between the bracket and the conductive sheet;

a magnet set comprising a plurality of magnets disposed in the framed space of the bracket, above the coil, and directly below the conductive sheet; and two elastic members with one of the elastic members located between an inner side of one of the side walls of the housing in the first horizontal direction and the first end of the bracket, and the other elastic member located between an inner side of another side wall on the other side of the housing in the first horizontal direction and the second end of the bracket, each elastic member connecting the housing and the bracket;

wherein the bracket comprises a top side and a bottom side, the magnet set comprises five magnets, and the five magnets are respectively defined as a first magnet, a second magnet, a third magnet, a fourth magnet and a fifth magnet; the first magnet has an S pole and an N pole, the second magnet has an S pole and an N pole, the third magnet has an S pole and an N pole, the fourth magnet has an S pole and an N pole, and the fifth magnet has an S pole and one N pole; the S pole of the third magnet faces the first end of the bracket, and the N pole of the third magnet faces the second end of the bracket; the first magnet and the second magnet are close to the S pole of the third magnet; the first magnet is located directly above the second magnet, the S pole of the first magnet faces the top side of the bracket, the S pole of the second magnet faces the bottom side of the bracket, and the N pole of the first magnet faces the N pole of the second magnet; the fourth magnet and the fifth magnet are close to the N pole of the third magnet; the fourth magnet is located directly above the fifth magnet, the N pole of the fourth magnet faces the top side of the bracket, the N pole of the fifth magnet faces the bottom side of the bracket, and the S pole of the fourth magnet faces the S pole of the fifth magnet.

* * * * *